United States Patent
Fujikawa et al.

(10) Patent No.: US 8,199,285 B2
(45) Date of Patent: Jun. 12, 2012

(54) DISPLAY DEVICE

(75) Inventors: Yohsuke Fujikawa, Mie (JP); Shoichi Andou, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 468 days.

(21) Appl. No.: 12/440,558

(22) PCT Filed: Jul. 23, 2007

(86) PCT No.: PCT/JP2007/064414
§ 371 (c)(1),
(2), (4) Date: Mar. 9, 2009

(87) PCT Pub. No.: WO2008/078425
PCT Pub. Date: Jul. 3, 2008

(65) Prior Publication Data
US 2009/0316090 A1    Dec. 24, 2009

(30) Foreign Application Priority Data
Dec. 22, 2006  (JP) .................................. 2006-346505

(51) Int. Cl.
*G02F 1/1333*   (2006.01)
*G02F 1/13*     (2006.01)
(52) U.S. Cl. ........................................ 349/110; 349/187
(58) Field of Classification Search .................. None
See application file for complete search history.

(56) References Cited

U.S. PATENT DOCUMENTS

| | | | |
|---|---|---|---|
| 5,155,612 A | 10/1992 | Adachi et al. | |
| 6,229,205 B1 | 5/2001 | Jeong et al. | |
| 7,782,437 B2 * | 8/2010 | Yamada et al. | 349/153 |
| 7,847,478 B2 * | 12/2010 | Chun et al. | 313/506 |
| 2004/0075801 A1 * | 4/2004 | Choi et al. | 349/153 |
| 2004/0179165 A1 * | 9/2004 | Kinoshita et al. | 349/158 |
| 2005/0240961 A1 | 10/2005 | Jerding et al. | |
| 2006/0112434 A1 | 5/2006 | Banker et al. | |
| 2006/0271973 A1 | 11/2006 | Jerding et al. | |
| 2008/0177998 A1 | 7/2008 | Apsangi et al. | |

FOREIGN PATENT DOCUMENTS

| | | |
|---|---|---|
| JP | 63-180932 A | 7/1988 |
| JP | 3-12635 A | 1/1991 |
| JP | 5-224196 A | 9/1993 |
| JP | 5-249422 A | 9/1993 |
| JP | 6-230356 A | 8/1994 |
| JP | 8-254692 A | 10/1996 |

(Continued)

OTHER PUBLICATIONS

English translation of WO (PCT/ISA/237) of PCT/JP2007/064414.

*Primary Examiner* — Michelle R Connelly Cushwa
(74) *Attorney, Agent, or Firm* — Birch, Stewart, Kolasch & Birch, LLP

(57) ABSTRACT

A light-blocking film is formed by a resin, is formed on a surface of a first substrate that is closer to a second substrate continuously without being interrupted along a side edge of the first substrate, and is formed extending from an outer edge of a display region to the side edge of the first substrate. The first substrate is formed to be thinner than the second substrate. A region having a uniform surface height is formed on the surface of the first substrate that is closer to the second substrate along the side edge of the first substrate.

14 Claims, 14 Drawing Sheets

FOREIGN PATENT DOCUMENTS

| | | | |
|---|---|---|---|
| JP | 08254692 A | * | 10/1996 |
| JP | 9-5731 A | | 1/1997 |
| JP | 10-91101 A | | 4/1998 |
| JP | 11-031776 | | 2/1999 |
| JP | 11-311776 A | | 11/1999 |
| JP | 2001-147313 A | | 5/2001 |
| JP | 2003-29302 A | | 1/2003 |
| JP | 2004-46115 A2 | | 2/2004 |
| JP | 2005-99541 A | | 4/2005 |
| JP | 2006-053169 | | 2/2006 |

* cited by examiner

FIG.16

| Sample model | | S1 | S2 | S3 | S4 | S5 | S6 | S7 | S8 | S9 | S10 |
|---|---|---|---|---|---|---|---|---|---|---|---|
| Thickness of substrate severed [mm] | First substrate | 0.70 | 0.50 | 0.38 | 0.20 | 0.30 | 0.30 | 0.20 | 0.05 | 0.07 | 0.225 |
| | Second substrate | 0.70 | 0.50 | 0.38 | 0.50 | 0.40 | 0.30 | 0.40 | 0.50 | 0.43 | 0.225 |
| | Total thickness | 1.40 | 1.00 | 0.76 | 0.70 | 0.70 | 0.60 | 0.60 | 0.55 | 0.50 | 0.45 |
| Severance interval (H) [mm] | Ave | 69.34 | 39.7 | 54.32 | 38.7 | 34.7 | 105.58 | 41.6 | 38.7 | 38.24 | 66.54 |
| Measured value | Max | 69.38 | 39.75 | 54.34 | 38.71 | 34.71 | 105.58 | 41.60 | 38.70 | 38.27 | 66.57 |
| | Min | 69.41 | 39.87 | 54.40 | 38.80 | 34.75 | 105.60 | 41.63 | 38.76 | 38.31 | 66.60 |
| | | 69.34 | 39.70 | 54.29 | 38.66 | 34.67 | 105.55 | 41.57 | 38.65 | 38.23 | 66.55 |
| | σ | 0.022 | 0.030 | 0.030 | 0.027 | 0.023 | 0.016 | 0.016 | 0.027 | 0.013 | 0.010 |
| | Number of samples measured | 10 | 400 | 20 | 20 | 20 | 20 | 20 | 20 | 300 | 200 |
| Cpk with tolerances specified on the right | ±0.2 | 3.00 | 2.22 | 2.18 | 2.48 | 2.91 | 4.25 | 4.28 | 2.44 | 5.23 | 6.42 |
| | ±0.15 | 2.25 | 1.66 | 1.64 | 1.86 | 2.19 | 3.19 | 3.22 | 1.84 | 3.92 | 4.82 |
| | ±0.1 | 1.50 | 1.11 | 1.09 | 1.24 | 1.46 | 2.13 | 2.15 | 1.22 | 2.62 | 3.21 |
| Relative evaluation | | C | C | C | C | C | B | B | C | B | A |

DISPLAY DEVICE

TECHNICAL FIELD

The present invention relates to a display device and, more particularly, to a display device having a light-blocking film and a back-side lighting section.

BACKGROUND ART

In recent years, flat panel-type display devices such as liquid crystal display devices have been commercialized and used in various electronic devices.

FIG. 19 is a perspective view illustrating a liquid crystal cell used in a liquid crystal display device. FIG. 18 is an enlarged perspective view showing, on an enlarged scale, a portion of FIG. 19.

A liquid crystal cell 100 has a structure in which a device substrate 102 and a counter substrate 101 are attached to each other with a liquid crystal layer (not shown), which is sealed by a sealing member (not shown), interposed therebetween. A row control circuit 103, a column control circuit 104, a group of wires 105, pixels, etc., are formed monolithically on the surface of the device substrate 102 that is closer to the liquid crystal layer. A light-blocking film (black matrix: often referred to as "BM") 113, a color filter (not shown), etc., are formed on the surface of the counter substrate 101 that is closer to the liquid crystal layer. An FPC (flexible printed circuit board) 106 is attached to the so-called "terminal region" of the device substrate 102. An optical film 107 such as a polarizer or a phase plate is attached to the outer-side surface of the liquid crystal cell 100.

In the present specification, the substrate on which the light-blocking film 113 is formed (the counter substrate 101) is referred to as the first substrate 101, and the substrate (the device substrate 102) to be attached thereto is referred to as the second substrate 102.

In general, the outer-side surface of the first substrate 101 serves as the display surface, and a backlight 111 including a light source 108 such as a cold-cathode tube or an LED and a light guide member 109 is arranged on the back of the second substrate 102, thus forming a so-called "transmissive-type" liquid crystal display device 110.

The light-blocking film 113 is formed around the whole display region including gap regions between pixels and a group of pixels. The light-blocking film 113 blocks unnecessary light from the backlight 111 on the back side, thus realizing a desirable contrast and also serving as a so-called "break line member" for preserving the aesthetically pleasant appearance of the bezel of the display device.

The liquid crystal cell 100 described above is normally manufactured by being cut out from large mother glasses 115 and 116. FIG. 20 is a perspective view showing the step of cutting out the liquid crystal cell 100 from the mother glasses 115 and 116.

Generally, after the mother glass 115 of the first substrate 101 and the mother glass 116 of the second substrate 102 are attached to each other, the mother glasses 115 and 116 are cut along an outer shape of a predetermined size, which is to be the liquid crystal cell 100. The cutting is done by a so-called "scribe-break method", for example. Specifically, as shown in FIG. 20, parallel grooves (scribe grooves) 118 are formed in advance on the surface of each of the mother glasses 115 and 116 using a rotary blade (scribing wheel) 117, after which an impact is applied. Thus, the glasses are cut into a plurality of liquid crystal cells 100.

The thickness of the first substrate 101 and that of the second substrate 102 are defined to be the same at about 0.5 mm, for example. While other terms such as "dividing", "severing" or "separating" may be used instead of the term "cutting", they are not substantially different in meaning but are merely different expressions used by different people in the art.

In such a cutting process, markings formed in advance on the mother glasses 115 and 116 may be used in some cases for alignment in a cutting process or for checking the finish of the cut position. As shown in FIG. 18, a marking may be formed on the surface of the first substrate 101 that is closer to the second substrate 102 (a marking A) or on the surface of the second substrate 102 that is closer to the first substrate 101 (a marking B). Moreover, the cut position of the first substrate 101 may be checked by a marking C formed on the second substrate 102.

The marking A on the first substrate 101 is formed by a light-blocking film of a metal or a black resin, and the marking B and the marking C on the second substrate 102 are formed by a thin metal film that forms a wire for an active matrix-type display device, for example.

A display device produced by cutting as described above normally employs a configuration where the light-blocking film is formed avoiding the outside area within a certain distance from the cut position, as disclosed in Patent Documents 1 and 2, for example.

Patent Document 1: Japanese Laid-Open Patent Publication No. H09-5731
Patent Document 2: Japanese Laid-Open Patent Publication No. H05-224196
Patent Document 3: Japanese Laid-Open Patent Publication No. 2004-46115

DISCLOSURE OF THE INVENTION

Problems to be Solved by the Invention

The trend for reducing the size of the bezel region around the display region in order to reduce the size of the outer shape of, and reduce the weight of, the display device, has been growing in recent years. It is also desired that the proportion of the light-blocking film with respect to the bezel will not be small. Therefore, it is not preferred to employ a configuration where no light-blocking film is formed in the outside area of the liquid crystal cell as disclosed in Patent Documents 1 and 2.

In view of this, one possible approach is to form the light-blocking film on the mother glass in advance to be larger than the outer shape of the liquid crystal cell so that when the liquid crystal cell is cut out, the light-blocking film will always be formed up to the edge of the outline of the liquid crystal cell. In this case, however, there are problems as follows.

FIG. 21 is a plan view of a liquid crystal cell, and FIG. 22 is a plan view showing, on an enlarged scale, the side edge of the liquid crystal cell. As shown in FIG. 22, with the method described above, the cut surface does not have a smooth finish, but the cut surface may have an undulation or burr 121 or a crack or break 122. In a case where the light-blocking film is a metal, the light-blocking film may suffer from problems such as corrosion. As a result, such a defective fracture surface of the light-blocking film leads to the leakage of light from the backlight and also detracts from the aesthetically pleasant appearance. In recent years, improvements have been made to the viewing angle and the brightness of display devices, and therefore there is a demand for reliably blocking the leakage of light from the backlight.

As disclosed in Patent Document 3, for example, many proposals have been made in the prior art to reduce the thickness of the first substrate and the second substrate. However, the light-blocking film is still not formed in the outside area of the liquid crystal cell, and as a natural consequence, the light-blocking property remains insufficient in the bezel section of the liquid crystal cell.

The present invention has been made in view of the above, and has an object to form a smooth cut surface on the edge while forming the light-blocking film up to the cut surface on the edge, thereby increasing the light-blocking property as much as possible.

Means for Solving the Problems

In order to achieve the object set forth above, a display device of the present invention is a display device, including: a first substrate including a light-blocking film formed thereon; a second substrate arranged so as to oppose the first substrate; and a back-side lighting section arranged on one side of the second substrate that is opposite to the first substrate, wherein a display region contributing to a display is formed at a center of the first substrate; the light-blocking film is formed by a resin, is formed on a surface of the first substrate that is closer to the second substrate continuously without being interrupted along a side edge of the first substrate, and is formed extending from an outer edge of the display region to the side edge of the first substrate; the first substrate is formed to be thinner than the second substrate; and a region having a uniform surface height is formed on the surface of the first substrate that is closer to the second substrate along the side edge of the first substrate.

Another display device of the present invention is a display device, including: a first substrate including a light-blocking film formed thereon; a second substrate arranged so as to oppose the first substrate; and a back-side lighting section arranged on one side of the second substrate that is opposite to the first substrate, wherein a display region contributing to a display is formed at a center of the first substrate; the light-blocking film is formed by a resin, is formed on a surface of the first substrate that is closer to the second substrate continuously without being interrupted along a side edge of the first substrate, and is formed extending from an outer edge of the display region to the side edge of the first substrate; the first substrate is formed with a thickness of 0.07 mm or more and 0.3 mm or less; and a region having a uniform surface height is formed on the surface of the first substrate that is closer to the second substrate along the side edge of the first substrate.

It is preferred that a marking which is a guide for cutting at least the first substrate is formed on the second substrate.

It is preferred that the marking is formed by a transparent conductive film.

It is preferred that a film thicker than the first substrate is attached to one surface of the first substrate that is opposite to the second substrate.

A liquid crystal layer may be provided between the first substrate and the second substrate, thereby obtaining a liquid crystal display device.

Functions

Next, functions of the present invention will be described.

The display device described above produces a display by transmitting light from a back-side lighting section through the display region of the second substrate and the first substrate. If a liquid crystal layer is provided between the first substrate and the second substrate, for example, the display device is formed into a liquid crystal display device.

In the display device, the light-blocking film is formed on the surface of the first substrate that is closer to the second substrate continuously without being interrupted along the side edge of the first substrate, and is formed extending from the outer edge of the display region to the side edge of the first substrate, whereby the entire region of the first substrate outside the display region is covered by the light-blocking film. Therefore, an excess of the light emitted from the back-side lighting section is reliably blocked by the light-blocking film.

The display device is formed by cutting a laminated base material into individual pieces, wherein the laminated base material is obtained by attaching together a substrate base material which is a collection of a plurality of first substrates and another substrate base material which is a collection of a plurality of second substrates.

If the light-blocking film is formed by a thin metal film as is in the prior art, the fracture surface may be distorted or burrs may be left thereon due to the film stress acting upon the thin metal film. In contrast, in the display device of the present invention, since the light-blocking film is formed by a resin, such a film stress is reduced, and it is possible to suppress the distortion of the fracture surface. Moreover, since what is exposed on the fracture surface is a resin, there will be no corrosion as with a metal. Furthermore, since the light-blocking film is formed on the surface of the first substrate that is closer to the second substrate, it is unlikely to be directly damaged in the cutting process.

Furthermore, since the first substrate is formed to be thinner than the second substrate, it is possible to suppress the progressive shear of the fracture surface formed on the first substrate when cutting the laminated base material. Therefore, the side edge of the first substrate will be formed by an even more precise cut surface. This is similarly true also when the first substrate is formed with a thickness of 0.07 mm or more and 0.3 mm or less. The thickness of the first substrate being smaller than 0.07 mm is not preferred because it will then be difficult to maintain the mechanical strength of the substrate. Particularly, when the first substrate is very thin, there is a problem in that a ripple-like display non-uniformity occurs when the first substrate to be the display surface is pressed with a finger, or the like, and the display non-uniformity does not immediately disappear even after releasing the finger from the display surface. Thus, it can be said that the first substrate which is formed to be very thin is not preferred.

The phrase "the surface height of the first substrate being uniform" as used herein means that at any position along one side edge of the first substrate, for example, the same kind or kinds of a film is formed by a known film deposition method on the surface of the first substrate. In general, a single kind of a film is deposited to a predetermined thickness in a single step. Therefore, achieving the uniformity of the kind or kinds of a film at any position along one side means nothing but achieving the uniformity of the surface height of the substrate film surface along the side. Examples of the thin film formation method for organic materials include a spin coating method, a roll coating method, a slit coating method, relief printing, flexographic printing, an inkjet method, etc. Examples of the thin film formation method for inorganic materials include a sputtering method, a CVD method, a vapor deposition method, etc. Alternatively, a film may be formed across the entire surface of the first substrate, thereafter polishing the surface of the film so as to positively realize a uniform surface height.

In addition, since a region having a uniform surface height is formed on the first substrate along the side edge of the first substrate, the first substrate is unlikely to be bent unevenly when cutting the laminated base material. Therefore, a crack is unlikely to occur in the first substrate in the cutting process, and it is possible to form a precise fracture surface on the side edge of the first substrate.

By forming a marking on the second substrate, the marking serves as a guide for cutting at least the first substrate in the process of cutting the laminated base material, thus allowing for an easy and precise cutting. In this case, it is preferred that the marking is formed by a transparent conductive film. In a case where pixel electrodes, etc., for example, of a transparent conductive film is formed on the second substrate, the marking can be formed by using the transparent conductive film, and the thickness can be made very small. This further suppresses uneven bending of the first substrate when cutting the laminated base material.

In the prior art, the marking for controlling the cutting of the first substrate is formed on the first substrate whereas the marking for controlling the cutting of the second substrate is formed on the second substrate, whereby it is not possible to avoid the occurrence of a crack due to the configuration of the markings (the material and the thickness). In contrast, the present invention significantly differs from the prior art in that the marking is provided by deliberately choosing a film with a smaller roughness instead of selecting the material to be the marking based merely on the visibility of the marking as is the case with the prior art.

Moreover, if a film thicker than the first substrate is attached to the surface of the first substrate that is opposite to the second substrate, it is possible by the film to support the mechanical strength of the first substrate even if the first substrate is formed to be very thin. Thus, it is possible to further reduce the thickness of the first substrate.

Effects of the Invention

According to the present invention, first, an excess of the light emitted from the back-side lighting section that is not used for the display is reliably blocked by the light-blocking film formed from the outer edge of the display region of the first substrate to the side edge of the first substrate. Moreover, since the light-blocking film is formed by a resin, it is possible to precisely form the side edge of the first substrate while also preventing the corrosion of the light-blocking film. In addition, since the first substrate is formed to be thinner than the second substrate, it is possible to suppress the progressive shear of the fracture surface, and the side edge of the first substrate can be formed by a precise fracture surface. Furthermore, since a region having a uniform surface height is formed on the first substrate along the side edge thereof, the first substrate is unlikely to be bent unevenly in the cutting process, and it is possible to suppress the occurrence of a crack in the side edge of the first substrate.

BRIEF DESCRIPTION OF THE DRAWINGS

FIG. 16 is a table showing experimental results.

DESCRIPTION OF REFERENCE NUMERALS

Figure 1:
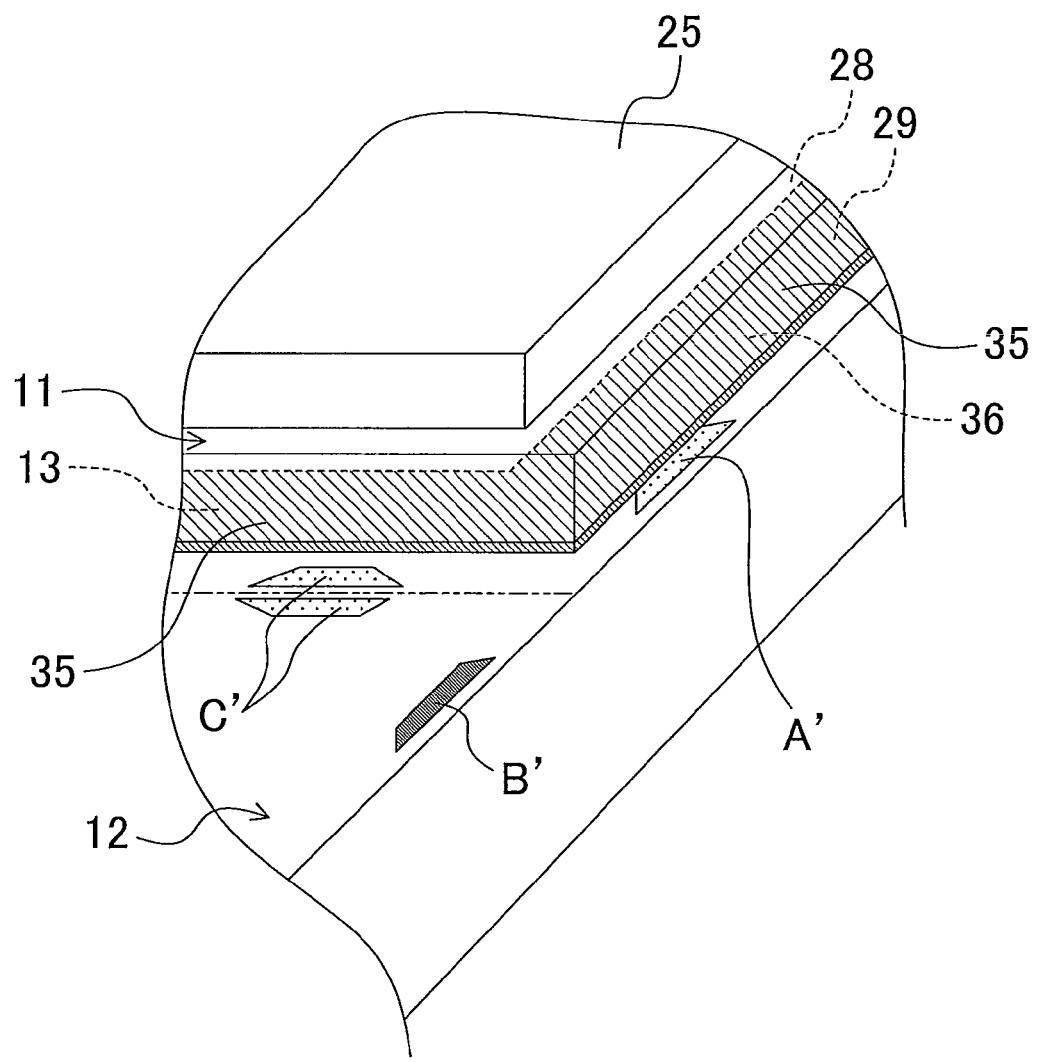
FIG. 1 is a perspective view showing, on an enlarged scale, a portion of FIG. 2.

A', B', C' Marking
X Cut-out line
1 Liquid crystal display device
10 Liquid crystal cell
11 First substrate
12 Second substrate
13 Light-blocking film
14 Scribe groove
15 Fracture surface
16 Scribing wheel
17, 18 Crack
20 Liquid crystal cell
21 Row control circuit
22 Column control circuit
23 Group of wires
25 Optical film
26 Mounting region
27 FPC
28 Display region
29 Bezel region
30 Backlight
35 Side edge
36 Region
38 Second thin film

BEST MODE FOR CARRYING OUT THE INVENTION

Before illustrating embodiments thereof, how the present invention was conceived will now be described, in the belief that it will help the understanding of the present invention.

In order to solve the problems described above, the present inventors repeatedly performed the experiment of cutting a liquid crystal cell, and then observed the finish of the cutting, before arriving at the present invention. As a result, we obtained important findings for the substrate cutting process, and made a drastic change in our way of thinking in order to overcome the problems described above.

That is, while one generally focuses on the processing precision in the planar direction of the substrate to be the display device (e.g., the precision of the processor side, such as the positional control or the movement control of the scribing wheel), the present inventors focused on the vertical configuration of the substrate, which is the object being processed, i.e., the cross-sectional configuration of the substrate (the type, thickness and distribution of the film materials).

Figure 17:
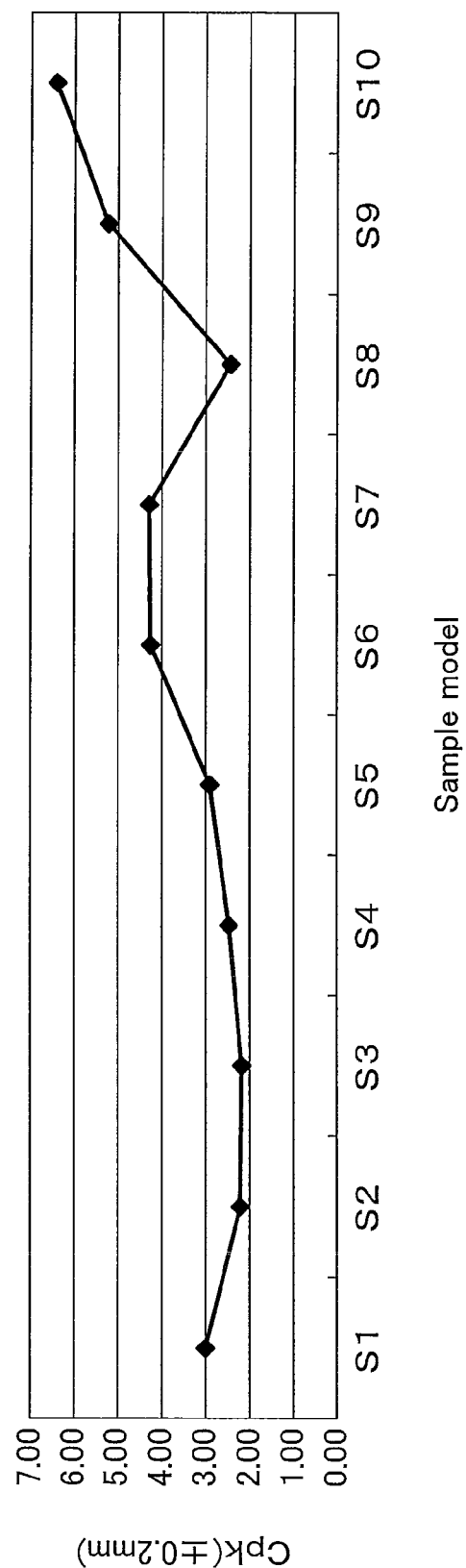
FIG. 17 is a graph showing the experimental results.
Figure 18:
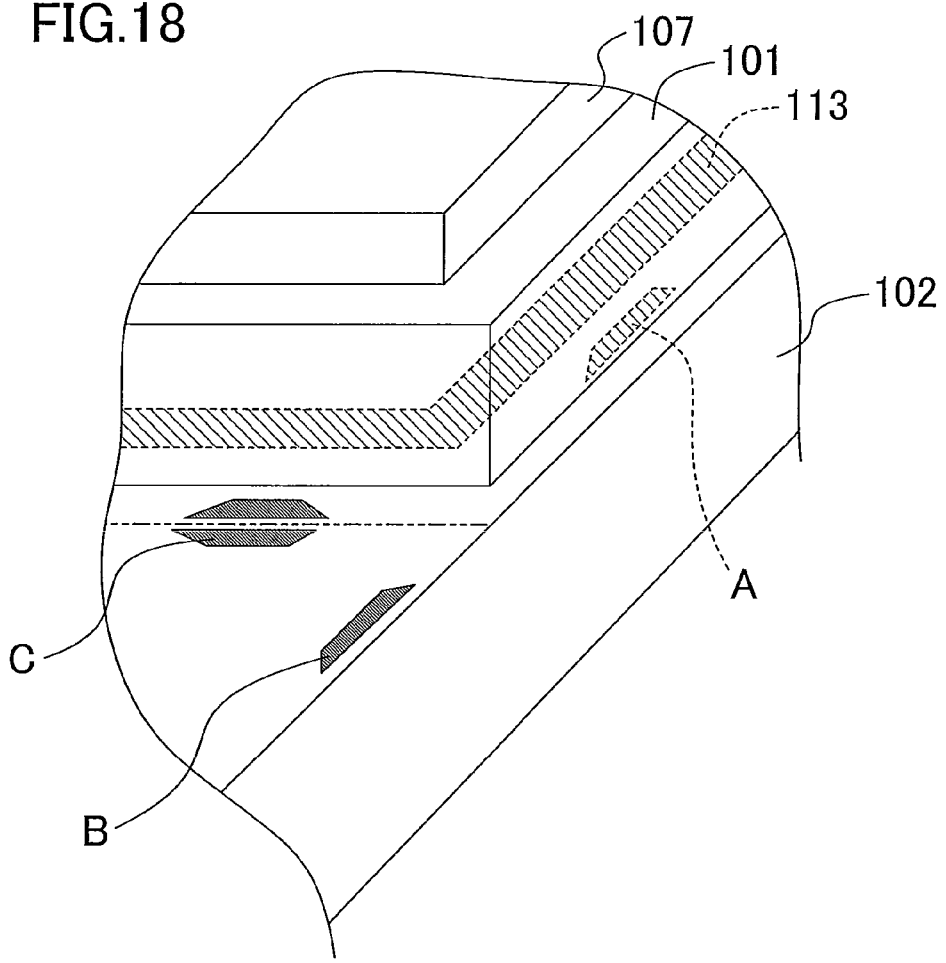
FIG. 18 is an enlarged perspective view showing, on an enlarged scale, a portion of FIG. 19.
Figure 19:
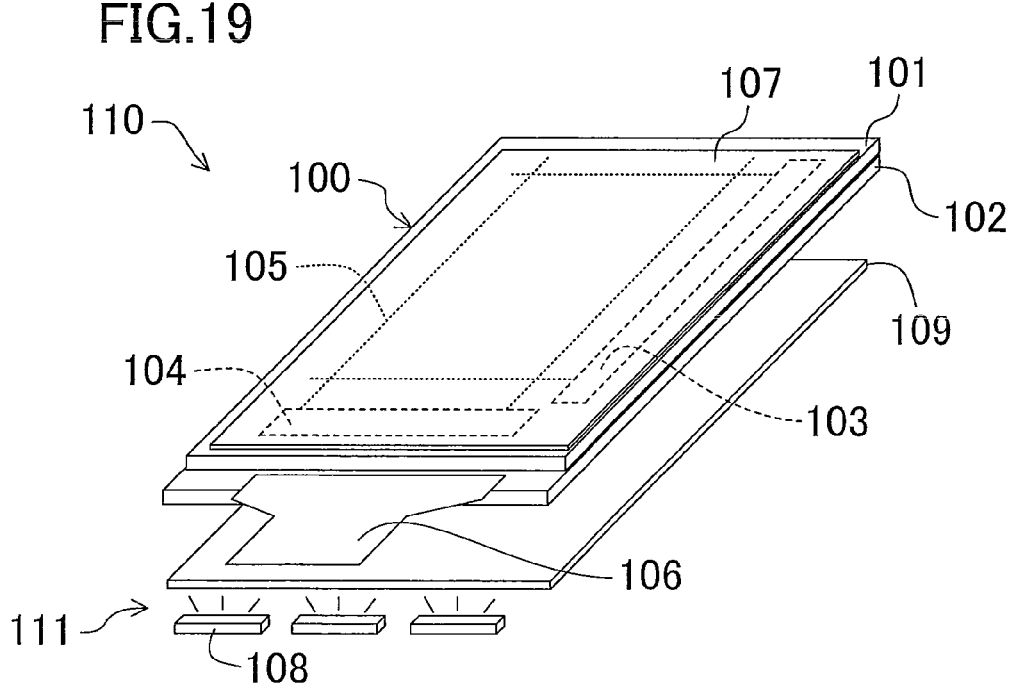
FIG. 19 is a perspective view illustrating a conventional liquid crystal cell.
Figure 20:
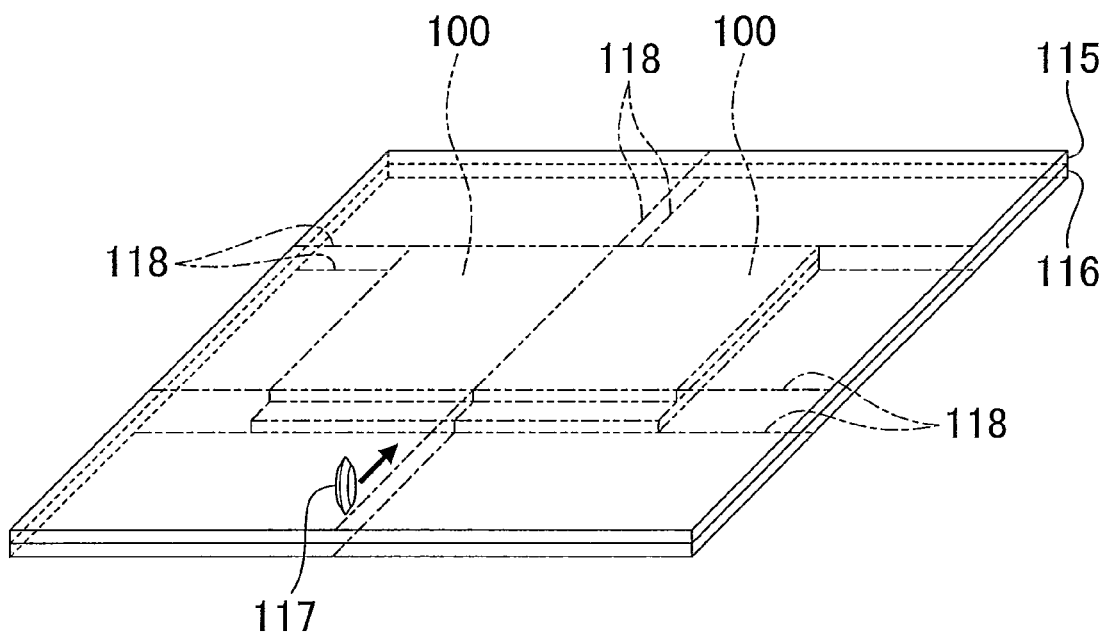
FIG. 20 is a perspective view showing a step of cutting out a liquid crystal cell from a mother glass.
Figure 21:
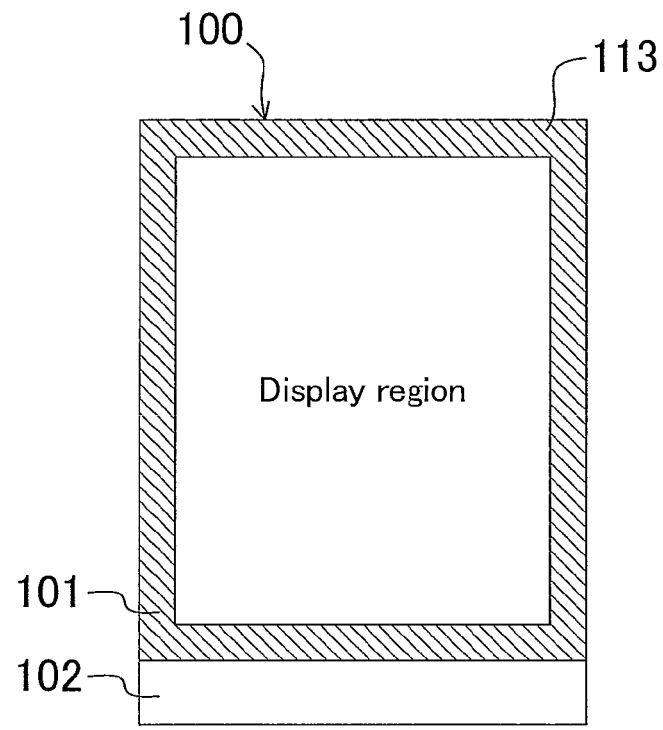
FIG. 21 is a plan view of a conventional liquid crystal cell.
Figure 22:
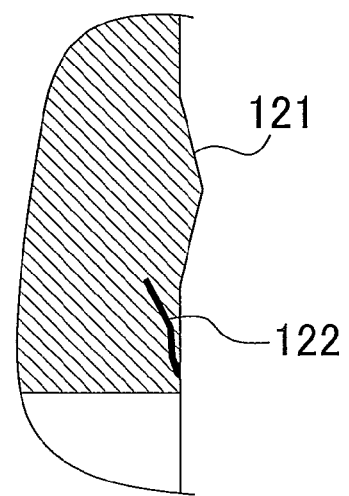
FIG. 22 is a plan view showing, on an enlarged scale, a side edge of a conventional liquid crystal cell.

FIGS. 11-14 are perspective views illustrating elements that influence the finish of the cut substrate. FIGS. 16 and 17 show the results of cutting various liquid crystal cells and measuring the final dimensions thereof.

Figure 15:
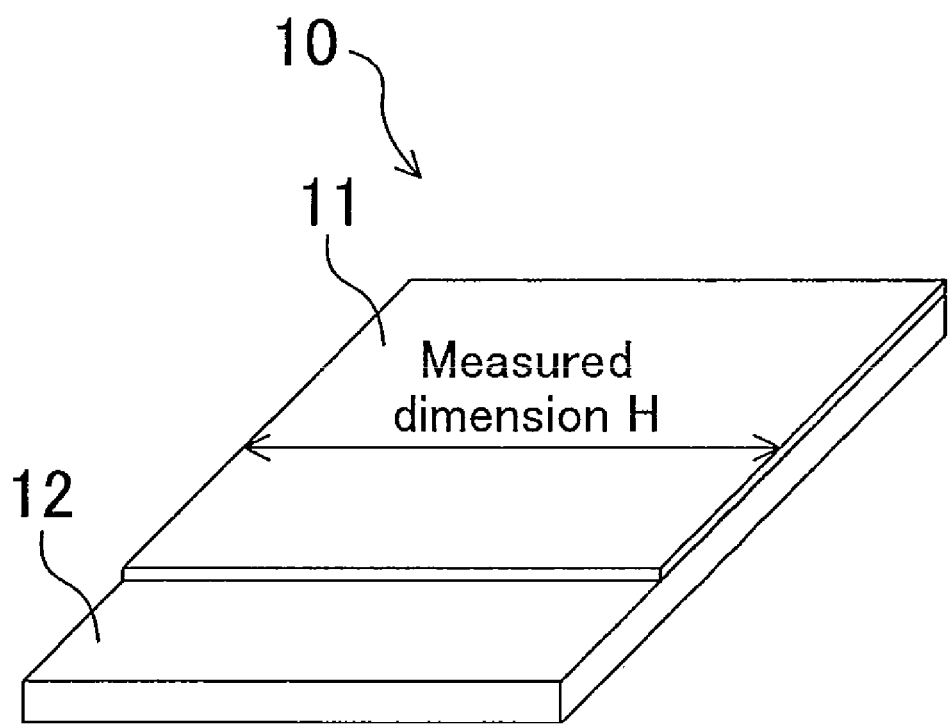
FIG. 15 is a perspective view showing a width of a liquid crystal cell measured in an experiment.

As shown in FIG. 15 which is a perspective view, each liquid crystal cell 10 used in the experiment includes a first substrate 11 and a second substrate 12 attached to each other with a liquid crystal layer interposed therebetween. A driving circuit including a low-temperature polycrystalline silicon is formed on the surface of the second substrate 12. The mother glass forming the first substrate 11 and the second substrate 12 was an alkali-free glass (#1737 from Corning Inc., or an equivalent thereof). The light-blocking film was formed on the surface of the first substrate 11 that is closer to the second substrate 12 in order to avoid direct breakage in the scribing process.

In the experiment of the liquid crystal cell 10, first, mother glasses of a uniform thickness (0.7 mm) to be the first substrate 11 and the second substrate 12 are attached to each other so that the cell gap is about 3 to 5 μm. Then, the mother glasses are subjected to a thinning process to achieve a predetermined thickness. Then, individual liquid crystal cells 10 are cut out by the scribe-break method. Then, the width H of each of the obtained liquid crystal cells 10 was measured as shown in FIG. 15.

As a result of the above experiment, we obtained the following four findings on the finish of the severance.

(First Finding)

Figure 11:
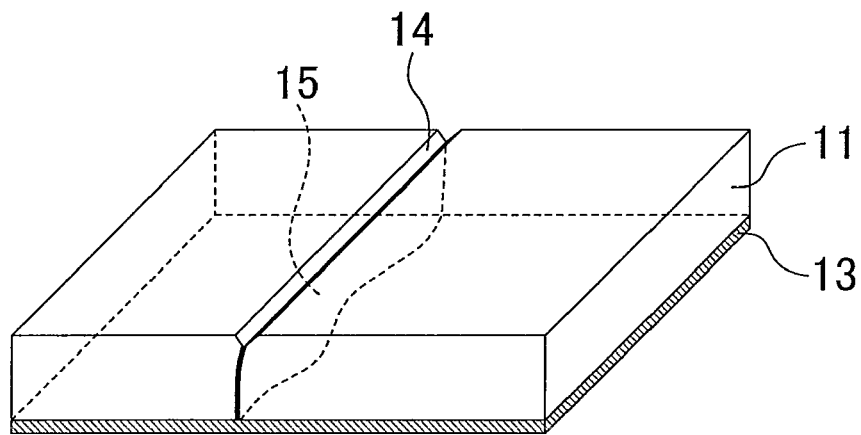
FIG. 11 is a perspective view shoving a first substrate with a distorted fracture surface.

As shown in FIG. 11 which is a perspective view, when a metal film is used as a light-blocking film 13, a fracture surface 15 extends, distorted due to the film stress thereof, from the surface of the first substrate 11, on which a scribe groove 14 is formed, to the opposite surface thereof, on which the light-blocking film 13 is formed.

It was found that this phenomenon occurs also when the metal film does not exist across the entire surface or when the metal film exists locally and unevenly (e.g., when alignment markings of a thin metal film are arranged in an island-like pattern along the line along which the substrate is to be severed). Moreover, since a metal film is exposed on the fracture end surface, the corrosion thereof is inevitable. Thus, it has been found that the material of the light-blocking film 13 is preferably a resin.

(Second Finding)

Figure 12:
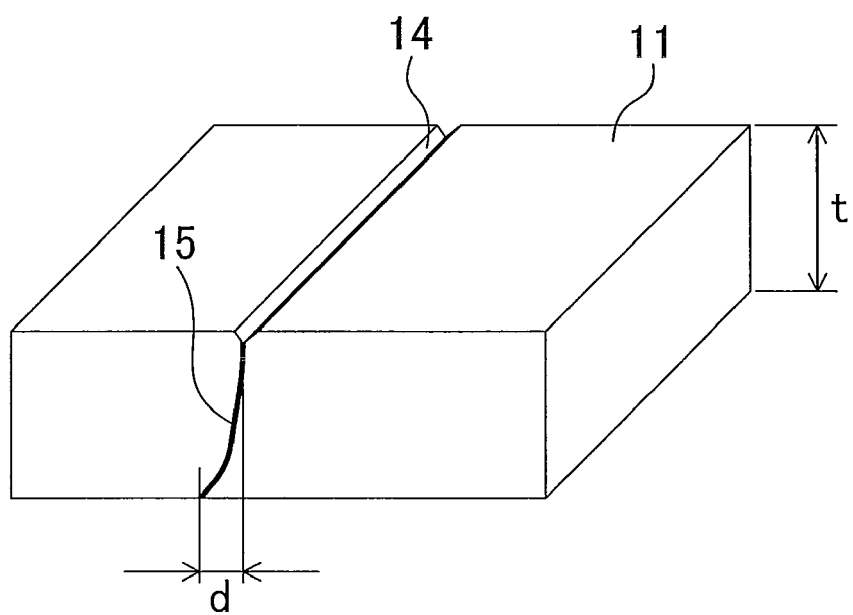
FIG. 12 is a perspective view showing a progressive shear of a fracture surface.

As shown in FIG. 12 which is a perspective view, the fracture surface 15, which progresses from the surface of the first substrate 11, on which the scribe groove 14 is formed, to the opposite surface thereof, will have a progressive shear d in the direction parallel to the surface of the first substrate 11. It is believed that this is because the cutting of the first substrate 11 is done by letting the crack develop naturally (in the natural course of events).

In view of this, the present inventors focused on the thickness t of the first substrate 11. That is, we arrived at an idea that by cutting the first substrate 11 after processing the substrate to be thin in advance, the progressive shear d can be made small as a result even if the cutting process shows an unpredictable behavior.

A well-known fact that may be relevant is found in, for example, "JIS B 0410:1991, General tolerances for parts formed by shear from metal plates". This standard shows smaller tolerances for smaller thicknesses of the board material. However, it states that the tolerance stays unchanged for board thicknesses of 1.6 mm or less.

Therefore, although it may be necessary to take into consideration the difference, i.e., the board material is a glass, it seems that we can infer, based on this well-known fact, that reducing the thickness of a glass plate having a thickness in the range (0.7 mm or 0.5 mm) for use in the liquid crystal cell 10 will not substantially influence the finish precision of the cutting.

FIGS. 16 and 17 show the results of measurement of predetermined dimensions of the liquid crystal cells 10 obtained by cutting mother glasses, which are glass substrates of various thicknesses, in the experiment of the present inventors.

In the experiment, ten different samples (S1-S10) were prepared. That is, the thicknesses of the first substrate 11 and the second substrate 12, which are glass substrates, were set to different values from 0.7 mm to 0.07 mm, and the liquid crystal cells 10 were cut out from various combinations of these substrates of the various thicknesses. The precision of the cut dimensions was evaluated in terms of the process capability index (Cpk). The larger the value of Cpk is, the more stably the finish can be within the predetermined tolerance. FIG. 16 shows the measured dimensions in detail, and FIG. 17 shows Cpk when the tolerance is ±0.2 mm.

Despite the above well-known fact, the experiment results indicated that the stability of the dimension precision was not in simple proportion to the thinness of the glass substrate, as shown in FIGS. 16 and 17. This can be seen, for example, from the fact that there are no clear changes that can be said to be significant differences through samples S1, S2, S3, S4 and S5.

Nevertheless, the dimension precision was seen to improve as the thickness of the substrate is reduced to a certain level. Specifically, the tendency was observed when the total thickness of the first substrate 11 and the second substrate 12 was 0.6 mm or less (the sample S6 and the subsequent samples).

With the sample S8, the dimension precision deteriorates even though the total thickness is 0.6 mm or less. It is believed that this is because the second substrate 12 was too thick (0.5 mm), and the dimension precision of the liquid crystal cell was significantly influenced by the dimension precision of the second substrate 12 for which the cutting precision is poor.

Thus, it was found that, if the total thickness of the liquid crystal cell 10 is 0.6 mm or less, and if the thickness of one of the substrates is 0.3 mm or less (the samples S6, S7, S9 and S10), the dimension of the liquid crystal cell 10 has a desirable precision, and it is possible to particularly desirably obtain the first substrate 11 with a light-blocking film having a smooth fracture surface, which is the goal to be attained in the present application.

Although not shown in FIGS. 16 and 17, the present inventors also made prototypes in which the thickness of the first substrate is 0.05 mm. In this case, there was a problem in that a ripple-like display non-uniformity occurs when the display surface is pressed with a finger, or the like, and the ripple-like display non-uniformity does not readily disappear. Therefore, it was inappropriate as a liquid crystal display device unless new countermeasures are taken for eliminating the display non-uniformity. According to the results, it is not preferred that the thickness of the first substrate is less than 0.07 mm since a display problem will then be inevitable.

Particularly, a display non-uniformity is likely to occur in a vertical alignment-type liquid crystal mode in which the display will be a normally black display. Also with a liquid crystal cell of a reflection-type display, which requires the cell thickness to be small, the orientation disturbance due to the deformation of the first substrate 11 cannot be overlooked.

Examples of the vertical alignment-type liquid crystal mode include the CPA alignment and the vertical TN alignment, for example. With these liquid crystal modes, it is possible to obtain a very high contrast ratio of about 1000, whereby it is possible to increase the brightness of the backlight to display a beautiful image with a high contrast and a high brightness. Therefore, the necessity of a sufficient light blocking around the liquid crystal cell is inevitably important. With the configuration of the present invention, it is possible to obtain a high-brightness, high-contrast display device having a smaller outer shape and a pleasant appearance with little light leakage from the backlight. In addition, since the first substrate 11 to be the display surface has an adequate thickness, it is possible to obtain a display device with no display disturbance.

In other words, the first substrate 11 of the display device of the present invention has an upper limit thickness (0.3 mm) with which a smooth fracture surface can be obtained, and a lower limit thickness (0.07 mm) with which it is possible to obtain a display with no disturbance due to deformation.

In a case where the dimension precision of the liquid crystal cell 10 can be on the conventional level, the thickness of the first substrate 11 with a light-blocking film formed thereon can simply be made 0.3 mm or less, irrespective of the total thickness. In this case, the precision of the outer shape of the liquid crystal cell 10 is on the conventional level, but the first substrate 11 with a light-blocking film formed thereon is thin, whereby it is possible to achieve a smooth finish of the fracture surface thereof, i.e., the fracture surface of the light-blocking film.

Although reducing the thickness of the substrate itself has been desired in the prior art, no concept has ever been disclosed, arriving at the realization of "the formation of a light-blocking film up to a cut surface of a liquid crystal cell" by "reducing the thickness of the substrate".

In other words, although "reducing the thickness of the substrate" has been an object of attention as a means for reducing the thickness or the weight of the liquid crystal display device, no one has arrived at the concept of shrinking the outer shape of the liquid crystal display device as viewed from above while ensuring a sufficient light blocking margin, by forming a light-blocking film up to the edge of the substrate and forming the light-blocking film with a smooth straight edge surface.

(Third Finding)

Figure 13:
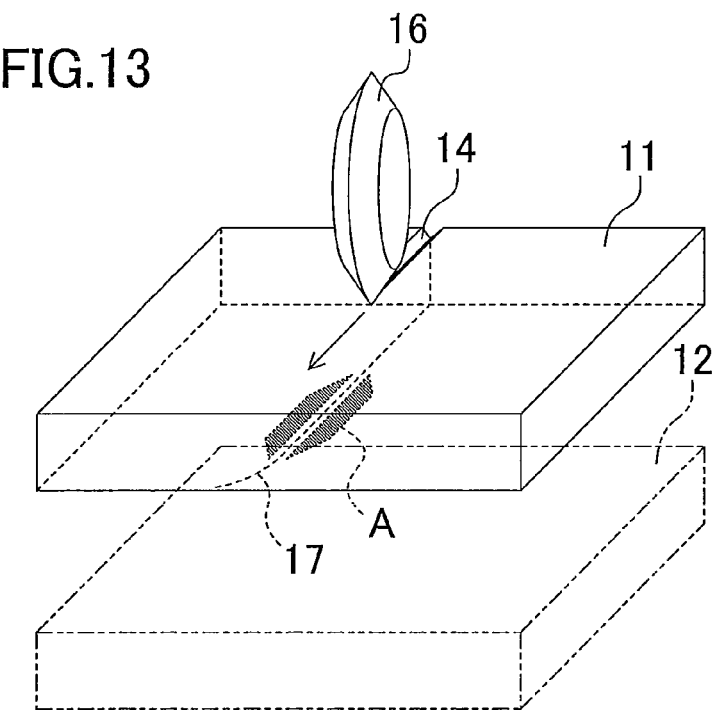
FIG. 13 is a perspective view showing a first substrate having a marking with a crack therein.

We also found that as shown in FIG. 13 which is a perspective view, in a case where the marking A to be a guide for forming the scribe groove 14 is formed on the surface of the first substrate 11 opposite to the surface on which the scribe groove 14 is formed, a crack 17 is likely to occur in the first substrate 11 starting from the marking A.

Specifically, as described above in the first finding section, such a problem occurs when the marking A is formed by a metal film in an island-like pattern, but it similarly occurs also when the marking A is formed by a resin film.

It is believed that this is because the marking A has a thickness (e.g., 1 to 2 μm) with which the film stress is small but non-negligible, whereby the first substrate 11 is bent unevenly when being scribed by a scribing wheel 16.

Specifically, at the moment the first substrate 11 is scribed by the scribing wheel 16, the first substrate 11 is bent, whereby the first substrate 11 and the second substrate 12 are in contact with each other with the thick marking A interposed therebetween.

Figure 3:
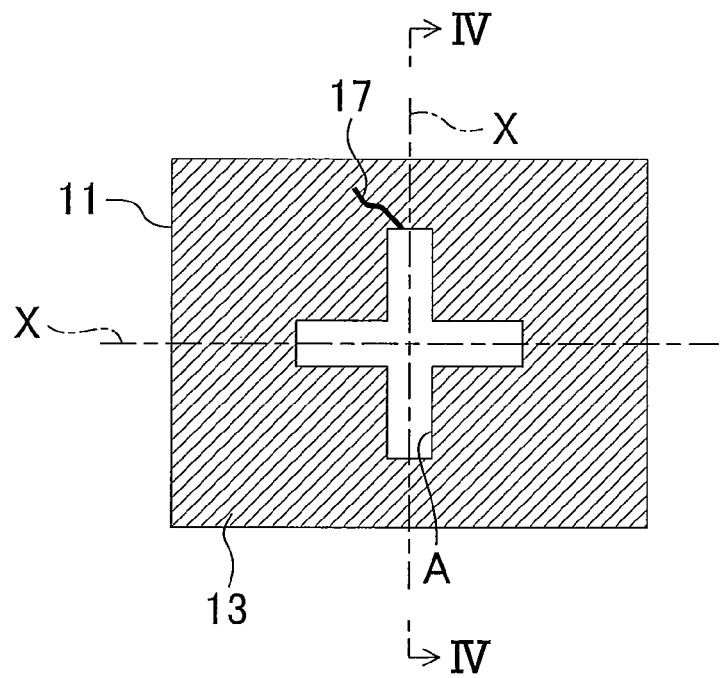
FIG. 3 is a plan view schematically showing a marking formed as a void pattern.
Figure 4:
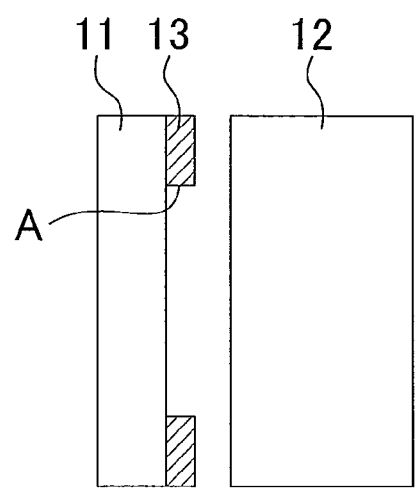
FIG. 4 is a cross-sectional view taken along line IV-IV in FIG. 3.

The problem of the crack 17 occurs not only when the marking A has an island-like pattern as shown in FIG. 13, but it similarly occurs also when the marking A is a so-called "void pattern" as shown in FIG. 3 which is a plan view and FIG. 4 which is a cross-sectional view taken along line IV-IV in FIG. 3. The one-dot chain line in FIG. 3 denotes the cut-out line X of the first substrate 11.

It can also be said that the problem readily becomes more pronounced in a case where the gap between the first substrate 11 and the second substrate 12 (the cell gap) is small, and the first substrate 11 and the second substrate 12 are attached to each other while being close to each other (e.g., a cell gap of about 3 μm is necessary for a vertical alignment-type liquid crystal mode or a reflection-type liquid crystal mode with a single polarizer). For reasons described above, the first substrate 11 is unlikely to be scribed normally.

Therefore, in view of the first finding and the third finding, it is not preferred to form a marking in the vicinity of the region where the first substrate 11 is to be cut whether the material of the marking is a metal or a resin.

(Fourth Finding)

Figure 14:
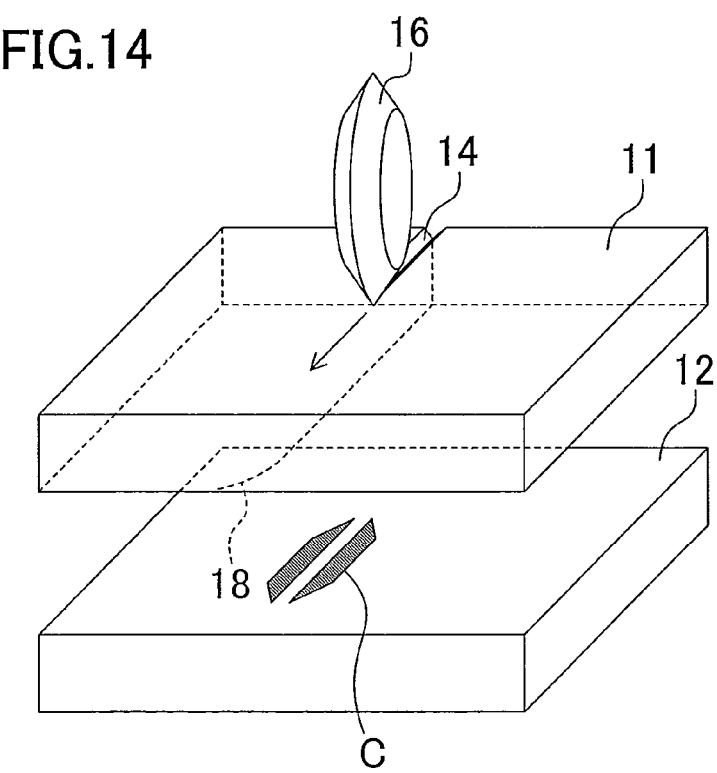
FIG. 14 is a perspective view showing a first substrate with a crack therein in a case where a marking is formed on a second substrate.

As shown in FIG. 14 which is a perspective view, it was found that a crack 18 is likely to occur in the first substrate 11 when the scribe groove 14 is formed by the scribing wheel 16 on the surface of the first substrate 11 with the marking C formed on the surface of the second substrate 12 that is closer to the first substrate 11.

For example, with an active matrix-type display device, the marking C is formed by a thin metal film which is a wire material having a thickness of about some thousands Å. The crack 18 is likely to occur starting from the marking C formed by such a thin metal film. Even if the marking C is absent, if a roughness of about some μm is present on the surface of the second substrate 12 that is closer to the first substrate 11, the roughness will be a starting point of a crack when cutting the first substrate 11.

It is believed that this is because the first substrate 11 is bent when being scribed, and the first substrate 11 is therefore in contact with the marking C or the roughness portion on the second substrate 12, whereby the first substrate 11 is not normally scribed, as described above in the third finding section.

According to the experiment by the present inventors, when the marking C was formed by a thin metal film having a thickness of 4000 Å for forming a gate electrode, the crack 18 occurred in the vicinity of the marking C, and the sample was therefore determined to be defective. On the other hand, when the marking C was formed by a transparent conductive film having a thickness of 1000 Å for forming a pixel electrode, the crack 18 did not occur in the vicinity of the marking C, and the sample was therefore determined to be non-defective.

Thus, in order to prevent the crack 18 from occurring, it is preferred that the material used for the marking C is a transparent conductive film (e.g., an ITO, an IZO, or the like, having a thickness of about 1000 Å), but not a thin metal film having a thickness of about some thousands Å, which is a wire material such as a gate bus line or a source bus line formed on an active matrix-type display device.

Embodiments of the present invention will now be described in detail with reference to the drawings. The present invention is not limited to the following embodiments.

<<Embodiment 1>>

FIGS. 1, 2 and 5-10 show Embodiment 1 of the present invention. In Embodiment 1, a so-called "transmissive-type" liquid crystal display device 1 will be described as an example of a display device.

Figure 2:
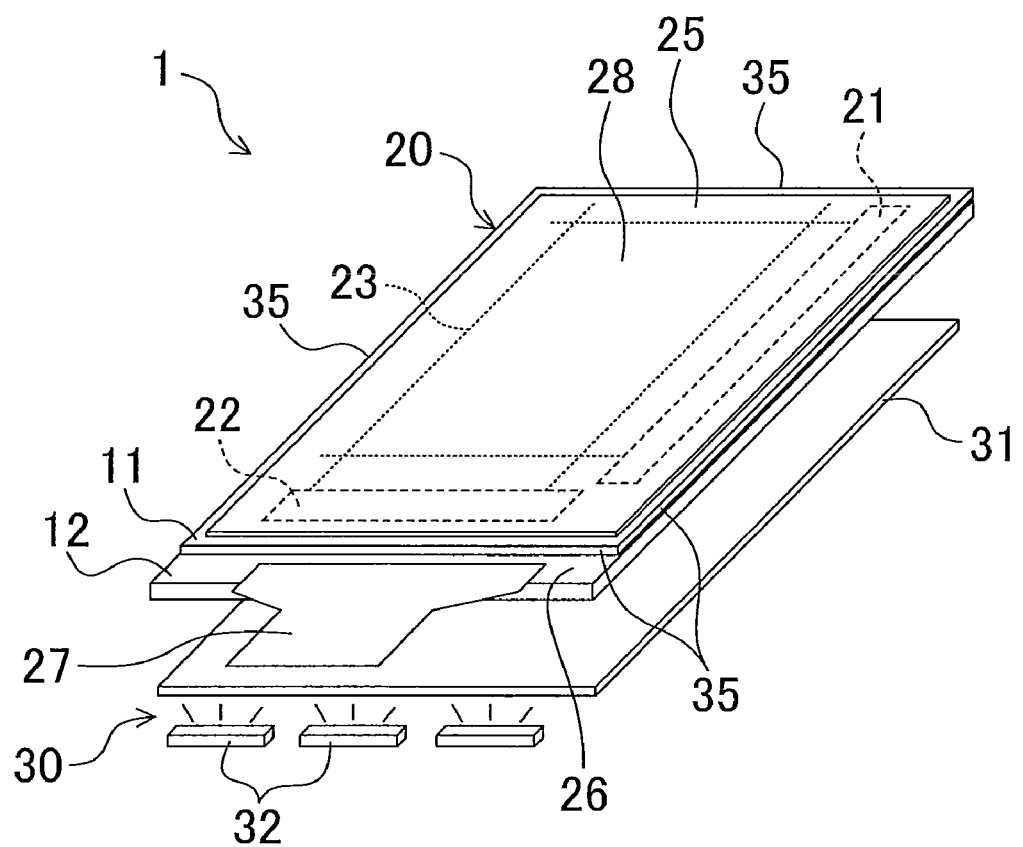
FIG. 2 is a perspective view showing a liquid crystal display device of Embodiment 1.

FIG. 2 is a perspective view illustrating a liquid crystal cell 20 used in the liquid crystal display device 1. FIG. 1 is an enlarged perspective view showing, on an enlarged scale, a portion of FIG. 2.

As shown in FIG. 2, the liquid crystal display device 1 includes the liquid crystal cell 20, and a backlight 30 which is a back-side light source section arranged on the back side (the side opposite to the observer) of the liquid crystal cell 20. The backlight 30 includes a plate-shaped light guide member 31 arranged so as to oppose the liquid crystal cell 20, and a plurality of light sources 32 arranged beside the light guide member 31. The light sources 32 may each be a cold-cathode tube or an LED (light emitting diode).

The liquid crystal cell 20 includes the first substrate 11 which is a counter substrate, the second substrate 12 which is a device substrate arranged so as to oppose the first substrate 11, and a liquid crystal layer (not shown) provided between the first substrate 11 and the second substrate 12. The liquid crystal layer is surrounded and sealed by a frame-shaped sealing member (not shown) between the first substrate 11 and the second substrate 12. The sealing member may be a UV curable resin, a thermosetting resin, or the like, for example.

The first substrate 11 is formed by a rectangular thin plate-shaped glass substrate, and is formed with a thickness of 0.07 mm or more and 0.3 mm or less. As shown in FIG. 1, the light-blocking film 13 which is a black matrix, a color filter (not shown), a common electrode (not shown), etc., are formed on the surface of the first substrate 11 that is closer to the liquid crystal layer. The common electrode may be formed by a transparent conductive film such as an ITO, for example. An optical film 25 such as a polarizer or a phase plate is attached to the surface of the first substrate 11 that is opposite to the second substrate 12. The optical film 25 is formed to be thicker than the first substrate 11.

A means for increasing the thickness of the optical film 25 may be to intentionally increase the thickness of a resin layer whose main component is cellulose triacetate which is to be the support layer of the polarizer, for example. It is also possible to increase the thickness of an adhesive layer for bonding the optical film 25 to the first substrate. Another means may be to laminate together a phase plate to be a ¼-wave plate and a polarizer, for example, which are suitably used in a reflection-type or reflection/transmission-type liquid crystal display device.

Other than the above laminate ((1) a laminate of a phase plate and a polarizer), the increase in the thickness of the optical film 25 can easily be realized by employing any of (2) a laminate of a viewing angle widening film and a polarizer, (3) a laminate of a scattering film for causing scattered light for a reflection-type display and a polarizer, (4) a laminate of an antiglare film or an antireflection film for reducing the glare and a polarizer, or by employing a combination of three or more. Thus, it is preferred that the optical film 25 is a laminate of a polarizer as a first film with another, second film, and it is most preferred that the second film is a film that contributes to the display, whereby there is no increase in the cost.

Particularly, what corresponds to the second film in the above configurations (1) to (4) is a very convenient element since it is a film to be attached to the substrate on the display surface side, i.e., the first substrate 11 which is subjected to a thinning process. This is because a scattering film or an antiglare/antireflection film is not necessary at all for the non-display surface of the second substrate 12. Thus, since it leads to an increase in the manufacturing cost to reduce the thickness of the second substrate 12 on the non-display surface side to be smaller than that of the first substrate 11 and attach, to the second substrate 12, a mere transparent film only for reinforcement that does not contribute to the display, it is preferred that the first substrate 11 on the display surface side is formed with a reduced thickness, as is the case with the present invention.

The optical film 25 is formed in a rectangular thin plate shape that is slightly smaller than the first substrate 11. In order to protect the first substrate 11 with a reduced thickness, a protection sheet of an acrylic resin, a glass, or the like, may be provided on the user-side surface of the liquid crystal display device 1.

A display region 28 that contributes to the display is formed at the center of the first substrate 11. The display region 28 is formed in a rectangular shape, and a region outside the outer edge of the display region 28 is a rectangular frame-shaped bezel region 29. Thus, the region on the first substrate 11 is composed of the display region 28 and the bezel region 29.

Moreover, the first substrate 11 is formed to be thinner than the second substrate 12, and a region 36 having a uniform surface height is formed on the surface of the first substrate 11 that is closer to the second substrate 12 along a side edge 35 of the first substrate 11. In other words, the flat region 36 is formed on the surface of the first substrate that is closer to the second substrate 12 along the side edge 35 of the first substrate 11.

The side edge 35 of the first substrate 11 refers to the four side as viewed in a direction normal to the first substrate 11, and forms the side wall surface of the first substrate 11. The side edge 35 forms the cut-out line (the cut edge) formed when the first substrate 11 is cut out from a base substrate.

The second substrate 12 is formed by a rectangular thin plate-shaped glass substrate so that the total thickness of the second substrate 12 and the first substrate 11 is 0.6 mm or less. Since the first substrate 11 is formed to be thinner than the second substrate 12, the thickness of the first substrate 11 with the light-blocking film 13 formed thereon can be made 0.3 mm or less while maintaining a predetermined thickness of the liquid crystal cell 20 as a whole to ensure a sufficient strength thereof.

As shown in FIG. 2, the second substrate 12 is attached to the first substrate 11, with only one side thereof projecting beside the first substrate 11. The side projecting region is a mounting region 26. An FPC (flexible printed circuit board) 27 for controlling the liquid crystal cell 20 is mounted on the mounting region 26.

The relative large thickness of the second substrate 12, on which members such as an FPC are to be mounted, is preferable in that it does not make the mounting process difficult. Particularly, in the case of COG mounting, since it is necessary to place a driver IC, the mounting region 26 projects beyond the first substrate 11 by about 3 to 5 mm, for example. Then, a reduced thickness of the second substrate 12 is likely to be a problem as there is a possibility of breakage of the mounting region 26.

When there is no demand for the strength of the substrate itself, the first substrate 11 and the second substrate 12 may both be formed to a thickness of 0.3 mm or less. For example, in a mounting scheme other than the COG mounting where only an FPC with a small number of terminals is attached, the length of projection of the mounting region 26 may be 2 mm or less. Therefore, problems described above are unlikely to occur even if the thickness of the second substrate 12 is reduced. Moreover, in such a case, the first substrate 11 with the light-blocking film 13 formed thereon can be formed to be thicker than the second substrate 12.

A row control circuit 21, a column control circuit 22, a group of wires 23, pixels (not shown), etc., are formed monolithically on the surface of the second substrate 12 that is closer to the liquid crystal layer. The pixels are arranged in a matrix pattern, and a TFT (thin film transistor: not shown) which is a switching device is formed in each pixel. The group of wires 23 connect the TFTs with the row control circuit 21 and the column control circuit 22. The backlight 30 is arranged on the side of the second substrate 12 opposite to the first substrate 11.

The light-blocking film 13 is formed in the region between the pixels and in the peripheral region around the display region 28 in which the group of pixels are formed (i.e., the bezel region 29). Thus, the light-blocking film 13 blocks unnecessary light emitted from the backlight 30, thereby realizing a desirable contrast, and also serves as a so-called "break line member" for preserving the pleasant appearance of the bezel of the liquid crystal display device 1.

The light-blocking film 13 is formed by a resin. The light-blocking film 13 is formed on the surface of the first substrate 11 that is closer to the second substrate 12 continuously without being interrupted along the side edge 35 of the first substrate 11, and is formed extending from the outer edge of the display region 28 to the side edge 35 of the first substrate 11. Thus, the light-blocking film 13 is formed on the flat region 36, and is formed across the entire bezel region 29 with no gaps therein.

As shown in FIG. 1, the markings A', B' and C' which are guides for cutting at least the first substrate 11 are formed on the second substrate 12. In other words, the markings A', B' and C' are markings indicating the cut-out position either for cutting the first substrate 11 or for cutting the first substrate 11 and the second substrate 12.

The markings A', B' and C' are formed so as to extend in a strip shape along the side edge 35 which is the cut-out line of the first substrate 11 or the second substrate 12 as viewed in a direction normal to the substrate. The markings A' and C' are formed by a transparent conductive film.

Figure 5:
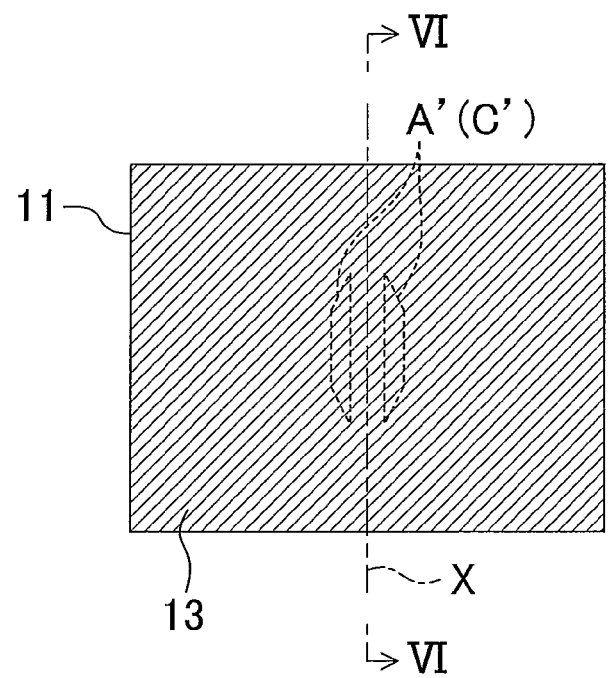
FIG. 5 is a plan view schematically showing a marking formed on a second substrate.
Figure 6:
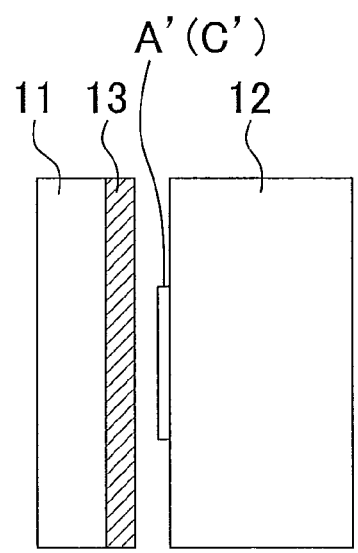
FIG. 6 is a cross-sectional view taken along line VI-VI in FIG. 5.

When the markings A' and C' are formed on the surface of the second substrate 12 that is closer to the first substrate 11, it is preferred that the markings A' and C' are formed by the thinnest film material formed on the second substrate 12. For example, as shown in FIG. 5 and FIG. 6 which is a cross-sectional view taken along line VI-VI in FIG. 5, the markings A' and C' are formed on the surface of the second substrate 12 that is closer to the first substrate 11. Thus, on the second substrate 12, a pixel electrode made of a transparent conductive film is formed for each pixel. For a transparent conductive film used for a pixel electrode, importance is placed on maintaining a sufficient transmittance, and the transparent conductive film is not used in a long wire, or the like, whereby the transparent conductive film is normally formed to be very thin. Therefore, such a thin transparent conductive film is suitable as a material of the markings A' and C' which does not cause a crack when cutting the first substrate 11.

As described above, the light-blocking film 13 is formed on the surface of the first substrate 11 that is closer to the second substrate 12 without being interrupted along the cut-out line (the cut edge) of the first substrate 11, and the marking A' is not formed on the surface of the first substrate 11 that is closer to the second substrate 12 but is formed on the surface of the second substrate 12 that is closer to the first substrate 11.

On the surface of the second substrate 12 that is closer to the first substrate 11 opposing the region in the vicinity of the cut-out line of the first substrate 11 (i.e., the side edge 35), there are no markings patterned by using a thin metal film for forming TFTs, TFDs (thin film diodes), etc. This reduces the roughness of the surface height on the surface of the second substrate 12 that is closer to the first substrate 11.

In Embodiment 1, the markings A' and C' formed by a transparent conductive film thinner than a thin metal film are provided, not markings formed by the thin metal film, on the region on the surface of the second substrate 12 that is closer to the first substrate 11 opposing the region in the vicinity of the cut-out line of the first substrate 11.

In the case of an active matrix-type liquid crystal display device using a thin metal film, a roughness is typically more likely to be formed on the surface of the second substrate 12. In view of this, the surface of the second substrate 12 can be uniformly flattened entirely across the display region and the region to be cut by forming a flattening film, or the like, for example.

However, in a liquid crystal display device, the pixel electrode may have a rough reflection surface with a scattering property, and a multi-gap region across which the thickness of the liquid crystal layer is varied by varying the surface height of the second substrate 12 may be formed in the display region 28. Therefore, in such a case, it is difficult to flatten the second substrate 12.

Therefore, it is preferred that a predetermined roughness is formed in the display region of the second substrate 12 (i.e., a region opposing the display region 28 of the first substrate 11), whereas in a region around the display region opposing the vicinity of the side edge 35 of the first substrate 11, no island-like pattern of the thin metal film is formed so as to realize a uniform film configuration in the cross-sectional direction and to thus avoid roughness formation.

On the other hand, in a region on the surface of the second substrate 12 that is closer to the first substrate 11 and that is not opposing the side edge 35 which is the cut-out line of the first substrate 11, the marking B' of a thin metal film may be formed so that the cut-out position of the second substrate 12 can be checked. Then, it is possible to increase the visibility of the marking B', whereby it is possible to easily perform the cut-out process of the second substrate 12. Even if the marking B' is formed by a thin metal film which is relatively thick, no crack will occur while forming the side edge 35 by cutting the substrate since it is sufficiently distant from the side edge 35 of the first substrate 11.

Needless to say, the marking B' may not be necessary if the cut-out position can be sufficiently checked by the marking A'. If the cut position can be checked by other markings arranged in the discarded substrate region around the liquid crystal cell on the mother glass, any of the markings A', B' and C' may be omitted, and in an extreme case, there may be none of the markings.

Thus, Embodiment 1 is also characteristic in that the markings A', B' and C' indicating the cut-out position are not formed uniformly by the same material, but are configured differently in view of the finish of the cutting. In other words, the material of the marking for the region opposing the side edge 35 of the first substrate 11 is different from that for the region not opposing the side edge 35 of the first substrate 11.

Figure 7:
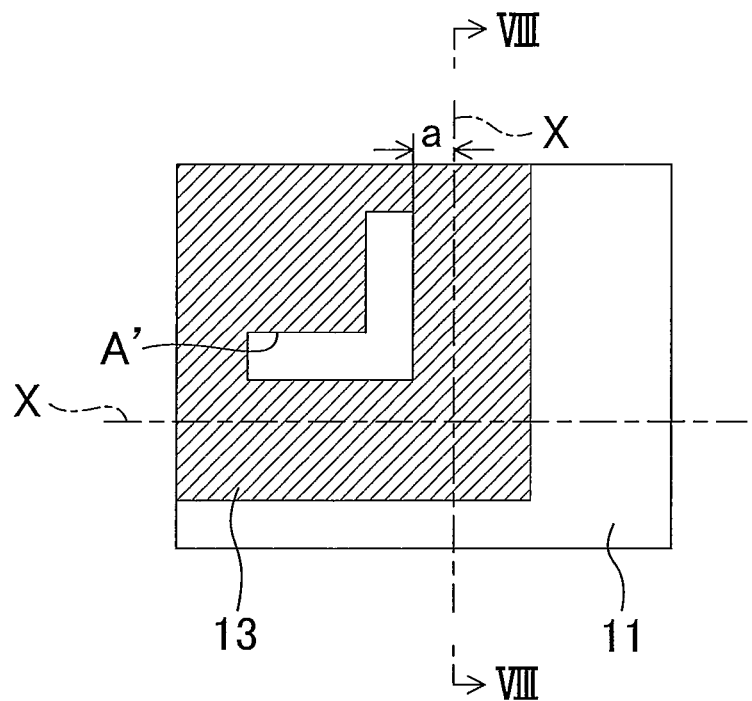
FIG. 7 is a plan view schematically showing a marking formed as an L-shaped void pattern.
Figure 8:
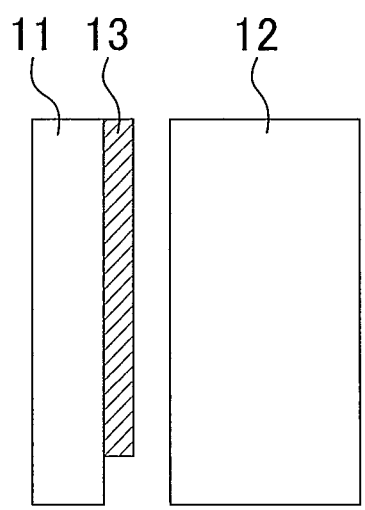
FIG. 8 is a cross-sectional view taken along line VIII-VIII in FIG. 7.

There may be a case where one desires to arrange markings on the surface of the first substrate 11 that is closer to the second substrate 12 for inevitable reasons. In such a case, the marking A' may be arranged at a predetermined distance a from the cut-out line X as shown in FIG. 7 which is a plan view and FIG. 8 which is a cross-sectional view taken along line VIII-VIII in FIG. 7. The distance a is assumed to be 50 μm or more in view of the mechanical position precision of the scribing wheel, for example. The marking A' may be formed by a void pattern obtained by cutting out a portion of the light-blocking film 13.

Figure 9:
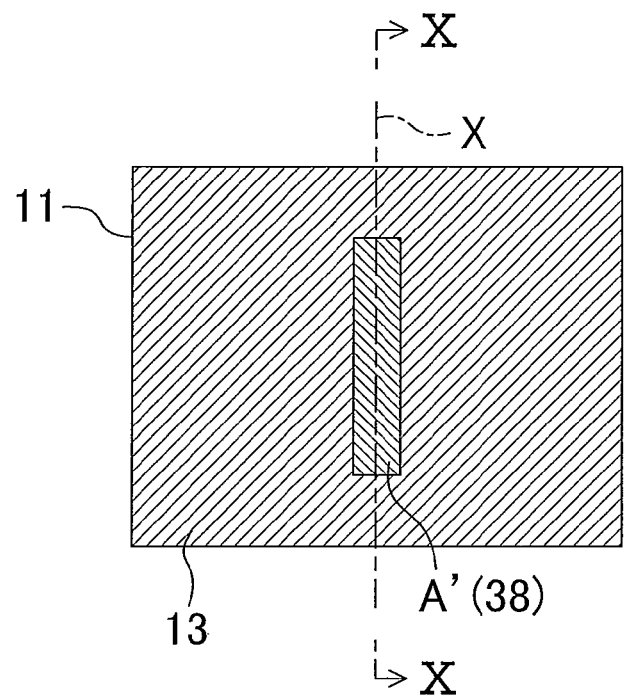
FIG. 9 is a plan view schematically showing a marking formed on a first substrate.
Figure 10:
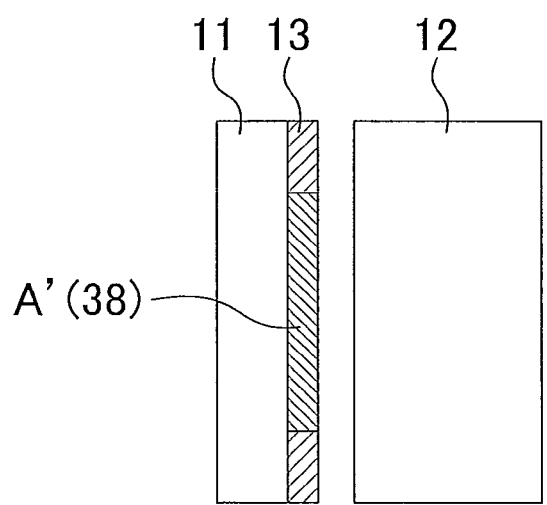
FIG. 10 is cross-sectional view taken along line X-X in FIG. 9.

Alternatively, an opening made by cutting the light-blocking film 13 may be filled by a second thin film 38 having substantially the same thickness, thereby forming the marking A' by the second thin film 38 as shown in FIG. 9 which is a plan view and FIG. 10 which is a cross-sectional view taken along line X-X in FIG. 9. In this case, the marking A' is arranged so as to be aligned with the cut-out line X as viewed in a direction normal to the substrate.

In order to make inconspicuous the back surface light leaking from the opening, it is preferred that a colored resin of blue, for example, which is a color filter with a low visibility, is used for the second thin film 38.

It is preferred that the marking A' formed by the second thin film 38 is formed in an L-letter shape, for example, and arranged so that the sides of the L-letter shape extend along the two cut-out lines X crossing each other as viewed in a direction normal to the substrate. Then, the opening can be brought closer to the cut-out line X, whereby it is possible to appropriately suppress the light leakage from the outer edge of the marking A'. Alternatively, the marking A' may be formed in a simple rectangular shape, and arranged so that one side thereof extends along the cut-out line X.

—Manufacturing Method—

Next, a method for manufacturing the liquid crystal display device 1 will be described.

The liquid crystal display devices 1 are manufactured by cutting out a plurality of liquid crystal cells 20 from a large laminated base material. Specifically, first, a first substrate base material (not shown) which is a collection of a plurality of first substrates 11 and a second substrate base material (not shown) which is a collection of a plurality of second substrates 12 are attached to each other with a sealing member arranged for each liquid crystal cell interposed therebetween, thereby forming a laminated base material.

A color filter, etc., are formed on the first substrate base material, and the light-blocking film 13 is also formed on the first substrate base material. The light-blocking film 13 is formed with no gaps between adjacent display regions 28. TFTs, pixel electrodes, wires, etc., are patterned on the second substrate base material, and the markings A', B' and C' are also formed on the second substrate base material. The markings A' and C' are formed by a transparent conductive film, and are formed in the same step as the pixel electrodes. The marking B' is formed by a thin metal film, and is formed in the same step as wires, etc., for example.

Then, scribe grooves are formed in a lattice pattern by a scribing wheel on the laminated base material. In this process, the scribing wheel is positioned using the markings A', B' and C' as guides. Then, a pressure is applied to the laminated base material, thereby letting a crack grow from the scribe groove. As a result, the laminated base material is cut into a plurality of liquid crystal cells 20. Each liquid crystal cell 20 is charged with a liquid crystal by a vacuum injection method, for example, and is sealed. Alternatively, a so-called "one drop filling method" may be used where the substrate base materials are attached to each other and a liquid crystal is charged therebetween in the attachment process.

Then, an FPC 27, etc., are mounted on the mounting region 26 of the liquid crystal cell 20, and the backlight 30 is attached on the back side of the liquid crystal cell 20. Thus, the liquid crystal display device 1 is manufactured.

—Effects of Embodiment 1—

Therefore, according to Embodiment 1, the light-blocking film 13 is formed by a resin, thereby suppressing production of unnecessary burrs in the substrate cutting process, and the light-blocking film 13 is formed on the side opposite to the surface on which the cutting scribe groove is formed, whereby there will be no direct damage to the light-blocking film 13 by the formation of the scribe groove. Moreover, since the distance between the surface on which the scribe groove is formed and the surface on which the light-blocking film 13 is formed is short, the shear of the crack naturally progressing from the surface on which the scribe groove is formed to the surface on which the light-blocking film 13 is formed in the process of cutting the laminated base material is reduced, and it is possible to obtain the liquid crystal display device 1 having a smooth fracture surface on the side edge 35 with the light-blocking film 13 extending to reach the side edge 35 of the first substrate 11. Even if the total thickness of the first substrate 11 and the second substrate 12 is of a normal value, it is possible to obtain the liquid crystal display device 1 with a smooth fracture surface of the light-blocking film 13. Moreover, no crack occurs even if the markings A', B' and C' are provided, thereby making easier the production control in the substrate cutting process.

Specifically, the light-blocking film 13 is formed on the surface of the first substrate 11 that is closer to the second substrate 12 continuously without being interrupted along the side edge 35 of the first substrate 11, and is formed extending from the outer edge of the display region 28 to the side edge 35 of the first substrate 11, whereby the entire region of the first substrate 11 outside the display region 28 can be covered by the light-blocking film 13. Therefore, an excess of the light emitted from the backlight 30 that is not used for the display is reliably blocked by the light-blocking film 13 even outside the display region 28.

If the light-blocking film 13 along the cut-out line of the first substrate 11 (the side edge 35) is formed by a thin metal film as is in the prior art, the fracture surface of the side edge 35 may be distorted or burrs may be left thereon due to the film stress acting upon the thin metal film. In contrast, in Embodiment 1, since the light-blocking film 13 is formed by a resin, such a film stress is reduced, and it is possible to suppress the distortion of the fracture surface. Thus, it is possible to form the side edge 35 of the first substrate 11 with a high-precision, smooth fracture surface.

Moreover, since the light-blocking film 13 exposed on the fracture surface is a resin, there will be no corrosion as with a metal. Furthermore, since the light-blocking film 13 is formed on the surface of the first substrate 11 that is closer to the second substrate 12, it is unlikely to be directly damaged by the scribing wheel in the cutting process.

In addition, since the first substrate 11 is formed with a thickness of 0.07 mm or more and 0.3 mm or less, and the first substrate 11 is formed so as to be thinner than the second substrate 12, it is possible to reduce the amount of shear, in the direction parallel to the first substrate 11, of the crack growing from the scribe groove when cutting the laminated base material, thus suppressing the progressive shear of the fracture surface. Therefore, the side edge 35 of the first substrate 11 will be formed by an even more precise cut surface.

The thickness of the first substrate 11 being smaller than 0.07 mm is not preferred because it will then be difficult to maintain the mechanical strength of the first substrate 11. Moreover, this is quite undesirable also in that the ripple-like display disturbance occurring when the thinned first substrate 11 is pressed with a finger, or the like, will be pronounced. The thickness of the first substrate 11 being greater than 0.3 mm is not preferred because the progressive shear of the fracture surface will then become pronounced.

Moreover, since the region 36 with a uniform surface height is formed along the side edge 35 of the first substrate 11, it is possible to make it unlikely that the first substrate 11 is bent unevenly when cutting the laminated base material. Therefore, it is possible to make it unlikely that a crack occurs when cutting the first substrate 11.

With the light-blocking film 13 formed on the surface of the first substrate 11 that is closer to the second substrate 12 so as to extend uniformly from the periphery of the display region 28 at least to the outside region beyond the cut-out line, it is possible even by the scribe-break method to obtain the first substrate 11 having a smooth fracture surface.

Since the markings A', B' and C' are formed on the second substrate 12, and they serve as guides for cutting at least the first substrate 11 when cutting the laminated base material, it is possible to realize an easy and precise cutting process. Moreover, since the markings A' and C' are formed by a transparent conductive film, the markings A' and C' can be formed by using the transparent conductive film forming pixel electrodes, for example, of the second substrate 12, and the markings A' and C' can be formed in the same step as that for the pixel electrodes without increasing an additional step. Moreover, the thickness of the markings A' and C' can be made very small as with the pixel electrodes. Therefore, it is possible to better suppress the uneven bending of the first substrate when cutting the laminated base material.

In addition, since the optical film 25 thicker than the first substrate 11 is attached to the surface of the first substrate 11 that is opposite to the second substrate 12, it is possible by the optical film 25 to support the mechanical strength of the first substrate 11 even if the first substrate 11 is formed to be very thin. Thus, it is possible to further reduce the thickness of the first substrate 11. Moreover, it is possible to suppress the deformation of the first substrate 11 when the display surface on the first substrate 11 (i.e., the surface of the display region 28) is pressed with a finger, or the like, and to thereby reduce the display disturbance.

As the liquid crystal cell 20 described above is built in a casing together with the backlight 30, it is possible to block light with a sufficient margin by the light-blocking film 13. Thus, it is possible to manufacture the liquid crystal display device 1 having a small outer shape and whose pleasant appearance is not detracted from, while eliminating the light leakage from around the liquid crystal cell 20.

<<Alternative Embodiments>>

While Embodiment 1 has been directed to a so-called "scribe-break method" in which the laminated base material is cut by forming a scribe groove with a wheel cutter, the present invention is not limited to this. Alternatively, the present invention is applicable to a processing method in which the start point of a cut is formed by a thermal stress that is locally caused by a laser, for example, and then a crack is allowed to develop therefrom. This is because the first finding and the second finding stand valid also with processing methods using a laser.

While Embodiment 1 has been directed to the liquid crystal display device 1 of the transmission type as an example of a display device, the present invention is not limited to this, but is similarly applicable to other types of display devices including a first substrate having a light-blocking film, a second substrate, and a back-side lighting section. Moreover, the present invention is not limited to transmission-type liquid crystal display devices, but is also applicable to transmission/reflection-type liquid crystal display devices.

INDUSTRIAL APPLICABILITY

As described above, the present invention is useful for a display device including a light-blocking film and a back-side lighting section, and is particularly suitable to cases where the light-blocking film is formed up to the cut surface on the edge of the substrate while making the cut surface on the edge smooth so as to realize a high light-blocking property.

The invention claimed is:

1. A display device, comprising:
a first substrate including a light-blocking film formed thereon;
a second substrate arranged so as to oppose the first substrate; and
a back-side lighting section arranged on one side of the second substrate that is opposite to the first substrate, wherein
a display region contributing to a display is formed at a center of the first substrate;
the light-blocking film is formed by a resin, is formed on a surface of the first substrate that is closer to the second substrate continuously without being interrupted along a side edge of the first substrate, and is formed extending from an outer edge of the display region to the side edge of the first substrate;
the first substrate is formed with a thickness of 0.07 mm or more and 0.3 mm or less;
a region having a uniform surface height is formed on the surface of the first substrate that is closer to the second substrate along the side edge of the first substrate;
a marking for cutting at least the first substrate is formed on the first substrate or the second substrate; and
the marking is formed as a void pattern in the light-blocking film.

2. The display device of claim 1, wherein a film thicker than the first substrate is attached to one surface of the first substrate that is opposite to the second substrate.

3. The display device of claim 1, wherein a liquid crystal layer is provided between the first substrate and the second substrate, thereby obtaining a liquid crystal display device.

4. The display device of claim 1, wherein
the first substrate is formed to be thinner than the second substrate.

5. A display device, comprising:
a first substrate including a light-blocking film formed thereon;
a second substrate arranged so as to oppose the first substrate; and
a back-side lighting section arranged on one side of the second substrate that is opposite to the first substrate, wherein
a display region contributing to a display is formed at a center of the first substrate;
the light-blocking film is formed by a resin, is formed on a surface of the first substrate that is closer to the second substrate continuously without being interrupted along a side edge of the first substrate, and is formed extending from an outer edge of the display region to the side edge of the first substrate;
the first substrate is formed with a thickness of 0.07 mm or more and 0.3 mm or less;
a region having a uniform surface height is formed on the surface of the first substrate that is closer to the second substrate along the side edge of the first substrate;

a marking for cutting at least the first substrate is formed on the first substrate or the second substrate; and the marking includes a void pattern formed in the light-blocking film, and a thin film having substantially the same thickness as the light-blocking film.

6. The display device of claim 5, wherein a film thicker than the first substrate is attached to one surface of the first substrate that is opposite to the second substrate.

7. The display device of claim 5, wherein a liquid crystal layer is provided between the first substrate and the second substrate, thereby obtaining a liquid crystal display device.

8. The display device of claim 5, wherein the thin film is a colored resin with a low visibility.

9. The display device of claim 5, wherein the first substrate is formed to be thinner than the second substrate.

10. A display device, comprising:

a first substrate including a light-blocking film formed thereon;

a second substrate arranged so as to oppose the first substrate; and a back-side lighting section arranged on one side of the second substrate that is opposite to the first substrate, wherein a display region contributing to a display is formed at a center of the first substrate;

the light-blocking film is formed by a resin, is formed on a surface of the first substrate that is closer to the second substrate continuously without being interrupted along a side edge of the first substrate, and is formed extending from an outer edge of the display region to the side edge of the first substrate;

the first substrate is formed with a thickness of 0.07 mm or more and 0.3 mm or less;

a region having a uniform surface height is formed on the surface of the first substrate that is closer to the second substrate along the side edge of the first substrate;

a marking for cutting at least the first substrate is formed on the first substrate or the second substrate; and the marking is formed in a region of the second substrate opposing the side edge of the first substrate, and a region of the second substrate not opposing the side edge of the first substrate, and the marking formed in the region of the second substrate opposing the side edge of the first substrate is made of a material different from a material of the marking formed in the region of the second substrate not opposing the side edge of the first substrate.

11. The display device of claim 10, wherein a film thicker than the first substrate is attached to one surface of the first substrate that is opposite to the second substrate.

12. The display device of claim 10, wherein a liquid crystal layer is provided between the first substrate and the second substrate, thereby obtaining a liquid crystal display device.

13. The display device of claim 10, wherein the marking is formed on only the second substrate so that at least part of the marking opposes the light-blocking film.

14. The display device of claim 10, wherein the first substrate is formed to be thinner.

* * * * *